United States Patent
Nishida et al.

(10) Patent No.: US 11,258,084 B2
(45) Date of Patent: Feb. 22, 2022

(54) FUEL CELL SYSTEM AND OPENING/CLOSING METHOD FOR DISCHARGE VALVE

(71) Applicant: TOYOTA JIDOSHA KABUSHIKI KAISHA, Toyota (JP)

(72) Inventors: Yusuke Nishida, Nisshin (JP); Tomotaka Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/919,646

(22) Filed: Jul. 2, 2020

(65) Prior Publication Data
US 2021/0075045 A1    Mar. 11, 2021

(30) Foreign Application Priority Data
Sep. 10, 2019   (JP) .............................. JP2019-164106

(51) Int. Cl.
*H01M 8/04746*   (2016.01)
*H01M 8/0438*    (2016.01)

(52) U.S. Cl.
CPC ... *H01M 8/04761* (2013.01); *H01M 8/04402* (2013.01); *H01M 2250/20* (2013.01)

(58) Field of Classification Search
CPC .............. H01M 8/043; H01M 8/0438; H01M 8/04402; H01M 8/04746; H01M 8/04761; H01M 2250/20
See application file for complete search history.

(56) References Cited

U.S. PATENT DOCUMENTS

2016/0133972 A1* 5/2016 Yamamoto ........ H01M 8/04402
                                                    429/414
2020/0036018 A1   1/2020 Yamanaka et al.

FOREIGN PATENT DOCUMENTS

JP    2008-059974 A    3/2008
JP    2020-017435 A    1/2020

* cited by examiner

*Primary Examiner* — Brittany L Raymond
(74) *Attorney, Agent, or Firm* — Hunton Andrews Kurth LLP

(57) ABSTRACT

A fuel cell system includes: a fuel cell generating electricity when being supplied with anode gas and cathode gas; a supply channel through which the anode gas to be supplied to the fuel cell flows; a discharge channel through which anode-off gas discharged from the fuel cell flows; a discharge valve provided on the discharge channel and opened to discharge the anode-off gas; and a control section controlling opening/closing of the discharge valve. The control section calculates a valve open time of the discharge valve corresponding to a target value of a discharge amount of the anode-off gas by using an aperture ratio of the discharge channel and the target value, and closes the discharge valve based on the valve open time, the aperture ratio of the discharge channel being calculated from a first discharge amount of the anode-off gas, which is discharged by opening of the discharge valve.

4 Claims, 4 Drawing Sheets

FUEL CELL SYSTEM AND OPENING/CLOSING METHOD FOR DISCHARGE VALVE

INCORPORATION BY REFERENCE

The disclosure of Japanese Patent Application No. 2019-164106 filed on Sep. 10, 2019 including the specification, drawings and abstract is incorporated herein by reference in its entirety.

BACKGROUND

1. Technical Field

The present disclosure relates to a fuel cell system and an opening/closing method for a discharge valve in the fuel cell system.

2. Description of Related Art

In a fuel cell system, a discharge valve is provided in a channel through which anode-off gas discharged from a fuel cell flows. A technique related to the fuel cell system that opens the discharge valve to discharge the anode-off gas and water produced by generation of electricity in the fuel cell has been known. In Japanese Unexamined Patent Application Publication No. 2008-059974 (JP 2008-059974 A), a technique of determining whether the discharge valve is frozen from a temperature of the discharge valve at the time of activating the fuel cell system and controlling the system by using a determination result is described.

SUMMARY

Even in the case where the discharge valve can be opened, for example, when ice exists in a part of a discharge channel, or the like, a cross-sectional area of the channel, through which the anode-off gas can flow, is reduced. As a result, a discharge amount of the anode-off gas is reduced. Thus, in consideration of such a case, a technique of discharging a target amount of the anode-off gas has been desired.

The present disclosure has been made to solve the above-described problem and can realize the following aspects.

(1) According to an aspect of the present disclosure, a fuel cell system is provided. This fuel cell system includes: a fuel cell that generates electricity when being supplied with anode gas and cathode gas; a supply channel through which the anode gas to be supplied to the fuel cell flows; a discharge channel through which anode-off gas discharged from the fuel cell flows; a discharge valve that is provided on the discharge channel and is opened to discharge the anode-off gas; and a control section that controls opening/closing of the discharge valve. The control section calculates a valve open time of the discharge valve that corresponds to a target value of a discharge amount of the anode-off gas by using an aperture ratio of the discharge channel and the target value, and closes the discharge valve based on the valve open time, the aperture ratio of the discharge channel being calculated from a first discharge amount of the anode-off gas, which is discharged by opening of the discharge valve, in a predetermined period.

According to this aspect, the valve open time of the discharge valve is calculated by using the aperture ratio, which is acquired from the first discharge amount of the anode-off gas discharged from the discharge valve, and the target value of the anode-off gas discharge amount. Then, the discharge valve is closed based on the calculated valve open time. Thus, even in the case where a part of the discharge channel is closed by freezing or the like, it is possible to discharge a target amount of the anode-off gas. Therefore, it is possible to keep concentration of the anode gas on an upstream side of the discharge valve at a desired value.

(2) In the above aspect, a pressure sensor that is arranged on an upstream side of the discharge valve may be provided. The control section may calculate the first discharge amount by using a variation in a pressure value that is measured by the pressure sensor, and may calculate the aperture ratio from the calculated first discharge amount.

According to this aspect, it is possible to calculate the aperture ratio from the first discharge amount, which is calculated by using the variation in the pressure value, and thereby calculate the valve open time.

(3) In the above aspect, the control section may calculate the aperture ratio from the first discharge amount at the time when the fuel cell does not generate the electricity.

According to this aspect, it is possible to suppress the variation in the pressure value, which is used to calculate the aperture ratio, from being influenced by a factor other than an anode-off gas discharge speed. Thus, it is possible to accurately calculate the aperture ratio. Therefore, it is possible to accurately discharge the target amount of the anode-off gas.

(4) A second aspect of the present disclosure provides an opening/closing method for a discharge valve that is provided in a discharge channel of anode-off gas discharged from a fuel cell in a fuel cell system including the fuel cell that generates electricity when being supplied with anode gas and cathode gas. This method includes: calculating a valve open time of the discharge valve that corresponds to a target value of a discharge amount of the anode-off gas by using an aperture ratio of the discharge channel and the target value, the aperture ratio of the discharge channel being calculated from a first discharge amount of the anode-off gas, which is discharged by opening of the discharge valve, in a predetermined period; and closing the discharge valve based on the valve open time.

According to this aspect, the valve open time of the discharge valve is calculated by using the aperture ratio, which is acquired from the first discharge amount of the anode-off gas discharged from the discharge valve, and the target value of the anode-off gas discharge amount. Then, the discharge valve is closed based on the calculated valve open time. Thus, even in the case where a part of the discharge channel is closed by freezing or the like, it is possible to discharge a target amount of the anode-off gas. Therefore, it is possible to keep concentration of the anode gas on an upstream side of the discharge valve at a desired value.

The present disclosure can also be realized in various aspects other than the above-described fuel cell system and the opening/closing method for the discharge valve. For example, the present disclosure can be realized by aspects such as a method for calculating the valve open time in the fuel cell system and a vehicle that includes the fuel cell system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Embodiment

Figure 1:
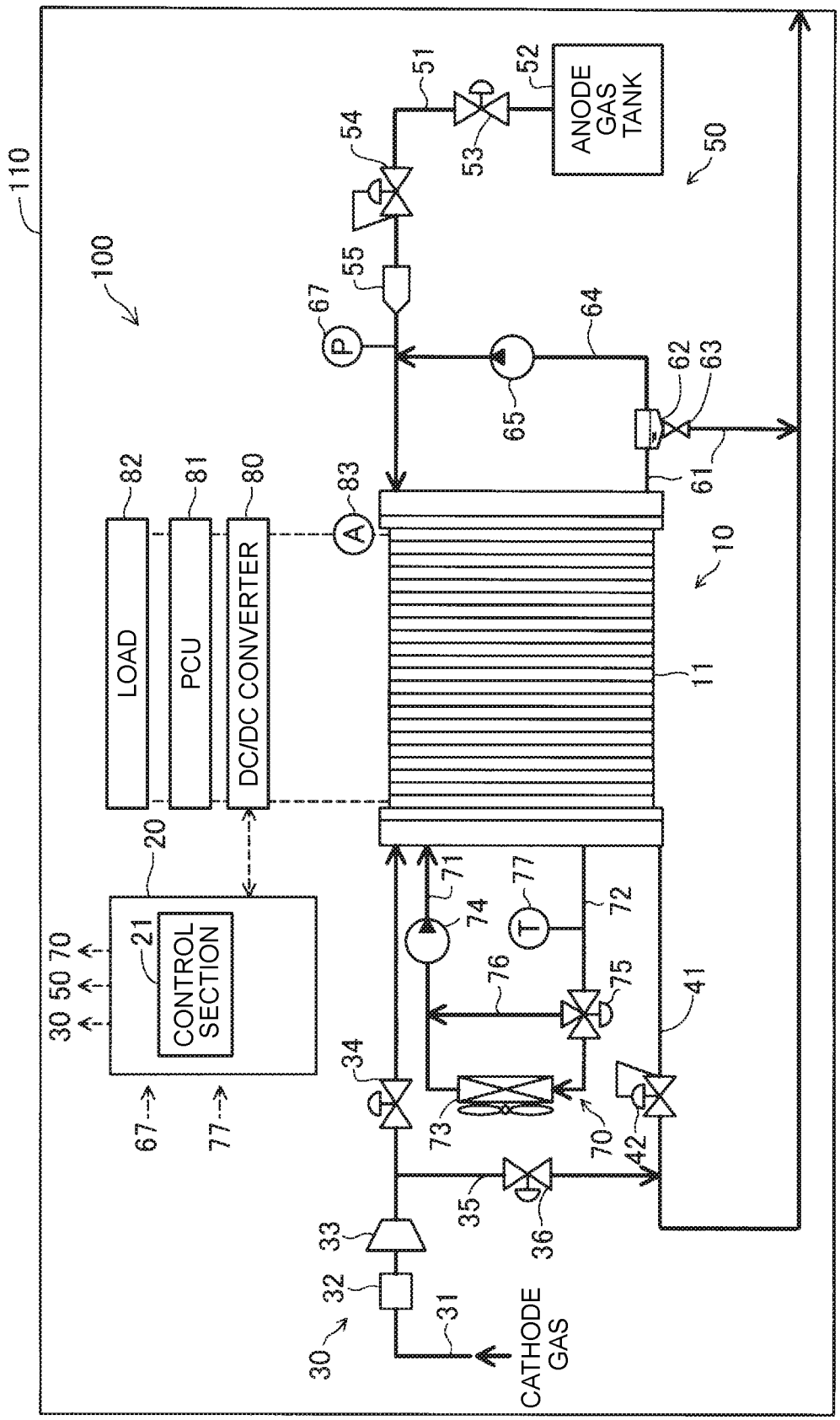
FIG. 1 is a schematic configuration diagram of a fuel cell system.

FIG. 1 is a schematic configuration diagram of a fuel cell system 100 as an embodiment of the present disclosure. The fuel cell system 100 is mounted on a vehicle 110, and outputs electricity as a power source of the vehicle 110 in response to a request from a driver.

The fuel cell system 100 includes a fuel cell stack 10, a controller 20, a cathode gas supply discharge section 30, an anode gas supply discharge section 50, a cooling medium circulation section 70, a DC/DC converter 80, a power control unit (hereinafter referred to as a "PCU") 81, and a load 82. The controller 20 is an ECU that includes a CPU, memory, and an interface, and functions as a control section 21 when loading and running a program stored in the memory.

The fuel cell stack 10 is constructed of stacked fuel cells 11. Each of the fuel cells 11 includes: a membrane-electrode assembly and a pair of separators holding the membrane-electrode assembly therebetween. The membrane-electrode assembly has: an electrolyte membrane; and an anode-side electrode and a cathode-side electrode arranged on surfaces of the electrolyte membrane. Each of the fuel cells 11 generates the electricity when being supplied with anode gas and cathode gas. For example, the anode gas is hydrogen, and the cathode gas is air.

The cathode gas supply discharge section 30 includes a cathode gas pipe 31, an airflow meter 32, a cathode gas compressor 33, a first open/close valve 34, a bypass pipe 35, a flow dividing valve 36, a cathode-off gas pipe 41, and a first regulator 42.

The airflow meter 32 is provided in the cathode gas pipe 31 and measures a flow rate of the intake air. The cathode gas compressor 33 is connected to the fuel cell stack 10 via the cathode gas pipe 31. When being controlled by the control section 21, the cathode gas compressor 33 compresses cathode gas suctioned from the outside, and supplies the compressed cathode gas to the fuel cell stack 10.

The first open/close valve 34 is provided between the cathode gas compressor 33 and the fuel cell stack 10, and is opened/closed when being controlled by the control section 21. The bypass pipe 35 is a pipe that connects a portion of the cathode gas pipe 31 between the cathode gas compressor 33 and the first open/close valve 34 to a portion of the cathode-off gas pipe 41 on a downstream side of the first regulator 42. The flow dividing valve 36 is provided in the bypass pipe 35, and regulates a flow rate of the air to each of the fuel cell stack 10 and the cathode-off gas pipe 41 when being controlled by the control section 21.

Through the cathode-off gas pipe 41, cathode-off gas that is discharged from the fuel cell stack 10 is discharged to the outside of the fuel cell system 100. The first regulator 42 regulates a pressure at a cathode gas exit of the fuel cell stack 10 when being controlled by the control section 21. A portion of the cathode-off gas pipe 41 on a downstream side of a connected portion to an anode-off gas pipe 61, which will be described later, can also be referred to as an "anode-off gas discharge channel".

The anode gas supply discharge section 50 includes an anode gas pipe 51, an anode gas tank 52, a second open/close valve 53, a second regulator 54, an injector 55, the anode-off gas pipe 61, a gas-liquid separator 62, a discharge valve 63, a circulation pipe 64, an anode gas pump 65, and a pressure sensor 67.

The anode gas pipe 51 is a supply channel used to supply the anode gas to the fuel cell stack 10. The anode gas tank 52 is connected to an anode gas entry of the fuel cell stack 10 via the anode gas pipe 51, and supplies the anode gas, which is filled therein, to the fuel cell stack 10. The anode gas pipe 51 is provided with the second open/close valve 53, the second regulator 54, and the injector 55 in this order from an upstream side, that is, on a near side of the anode gas tank 52. The second open/close valve 53 is opened/closed when being controlled by the control section 21. The second regulator 54 regulates a pressure of the anode gas on an upstream side of the injector 55 when being controlled by the control section 21. The injector 55 is an open/close valve that is electromagnetically driven according to a drive cycle and a valve open time set by the control section 21, and regulates a supply amount of the anode gas supplied to the fuel cell stack 10. A plurality of the injectors 55 may be provided in the anode gas pipe 51.

The anode-off gas pipe 61 is connected to an anode-off gas exit of the fuel cell stack 10 and communicates between the fuel cell stack 10 and the outside of the fuel cell system 100. The anode-off gas pipe 61 is a discharge channel through which the anode-off gas discharged from the fuel cell stack 10 flows. The gas-liquid separator 62 is provided on the anode-off gas pipe 61. The gas-liquid separator 62 separates water from the anode-off gas, which contains the anode gas, nitrogen gas, and the like not used for an electricity generation reaction, for storage.

The discharge valve 63 is provided vertically below the gas-liquid separator 62 on the anode-off gas pipe 61, and is opened/closed when being controlled by the control section 21. When the discharge valve 63 is opened, water in the gas-liquid separator 62 and the anode-off gas are discharged from the discharge valve 63. The water and the anode-off gas, which are discharged from the discharge valve 63, are discharged to the outside through the cathode-off gas pipe 41. In the case where the discharge valve 63 is closed, the anode gas is used to generate the electricity while impurities other than the anode gas are not consumed. The impurities include nitrogen that has permeated from the cathode side to the anode side, for example. Thus, concentration of the impurities in the anode-off gas is gradually increased. When the discharge valve 63 is opened at this time, together with the cathode-off gas, the anode-off gas is discharged to the outside of the fuel cell system 100. While the discharge valve 63 is open, the injector 55 keeps supplying the anode gas. Thus, concentration of the anode gas on the downstream side of the injector 55 is gradually increased.

The circulation pipe 64 is a pipe that connects the gas-liquid separator 62 and a portion of the anode gas pipe 51 on the downstream side of the injector 55. The anode gas pump 65 is provided in the circulation pipe 64. The anode gas pump 65 is driven when being controlled by the control section 21, and feeds the anode-off gas, from which water is separated by the gas-liquid separator 62, into the anode gas pipe 51. In this fuel cell system 100, the anode-off gas that contains the anode gas is circulated and supplied again to the fuel cell stack 10, so as to improve use efficiency of the anode gas.

The pressure sensor 67 is provided in a portion of the anode-off gas pipe 61 on an upstream side of the discharge valve 63. The pressure sensor 67 only needs to be provided in any of a portion of the anode gas pipe 51 on the downstream side of the injector 55, a portion of the anode-off gas pipe 61 on the upstream side of the discharge valve 63, and the circulation pipe 64. The pressure sensor 67 sends a measurement result to the control section 21.

The cooling medium circulation section 70 includes a refrigerant supply pipe 71, a refrigerant discharge pipe 72, a radiator 73, a refrigerant pump 74, a three-way valve 75, a bypass pipe 76, and a temperature sensor 77. The cooling medium circulation section 70 circulates a cooling medium in the fuel cell stack 10 and thereby regulates a temperature of the fuel cell stack 10. For example, water, ethylene glycol, the air, or the like is used as the refrigerant.

The refrigerant supply pipe 71 is connected to a cooling medium entry of the fuel cell stack 10, and the refrigerant discharge pipe 72 is connected to a cooling medium exit of the fuel cell stack 10. The radiator 73 is connected to the refrigerant discharge pipe 72 and the refrigerant supply pipe 71, cools the cooling medium that flows therein from the refrigerant discharge pipe 72 by a blast of wind from an electric fan, or the like, and then discharges the cooled cooling medium into the refrigerant supply pipe 71. The refrigerant pump 74 is provided in the refrigerant supply pipe 71 and pressure-feeds the refrigerant to the fuel cell stack 10. When being controlled by the control section 21, the three-way valve 75 regulates a flow rate of the refrigerant to each of the radiator 73 and the bypass pipe 76. The temperature sensor 77 measures a temperature of the refrigerant that is discharged from the fuel cell stack 10, and sends a measurement value to the control section 21.

The DC/DC converter 80 boosts an output voltage of the fuel cell stack 10 and supplies the boosted output voltage to the PCU 81. An inverter is installed in the PCU 81. When being controlled by the control section 21, the PCU 81 supplies the electricity to the load 82 via the inverter. The electricity of the fuel cell stack 10 and a secondary battery, which is not illustrated, is supplied, via a power supply circuit including the PCU 81, to the load 82 such as a traction motor (not illustrated) for driving wheels (not illustrated), the cathode gas compressor 33, the anode gas pump 65, and the various valves. A current sensor 83 measures an output current value of the fuel cell stack 10, and sends a measurement value to the control section 21.

The control section 21 controls each of the sections of the fuel cell system 100 according to the requested electricity, and controls the output of the fuel cell stack 10. The requested electricity includes: an external electricity generation request by the driver of the vehicle 110, on which the fuel cell system 100 is mounted, or the like; and an internal electricity generation request for supplying the electricity to auxiliary machines of the fuel cell system 100. The external electricity generation request is increased as a depression amount of an accelerator pedal, which is not illustrated, in the vehicle 110 is increased.

The control section 21 executes opening/closing processing to open the discharge valve 63 when a valve open condition for the discharge valve 63 is established and to close the discharge valve 63 when a valve closing condition for the discharge valve 63 is established. More specifically, in the case where the valve open condition is established, the control section 21 supplies an open signal to a motor or the like, which is not illustrated and is provided in the discharge valve 63. In the case where the valve closing condition is established, the control section 21 supplies a closing signal to the motor or the like of the discharge valve 63. For example, the valve open condition is that water stored in the gas-liquid separator 62 reaches a prescribed value or that concentration of nitrogen on the downstream side of the injector 55 is equal to or higher than a prescribed value. An amount of water stored in the gas-liquid separator 62 and the concentration of nitrogen on the downstream side of the injector 55 during closing of the discharge valve 63 are calculated based on an amount of the electricity of the fuel cell stack 10 that is calculated by using the measurement value of the current sensor 83, for example. The valve closing condition is that the valve open time has elapsed since the discharge valve 63 is opened. The valve open time is calculated in valve open time calculation processing, which will be described later.

Figure 2:
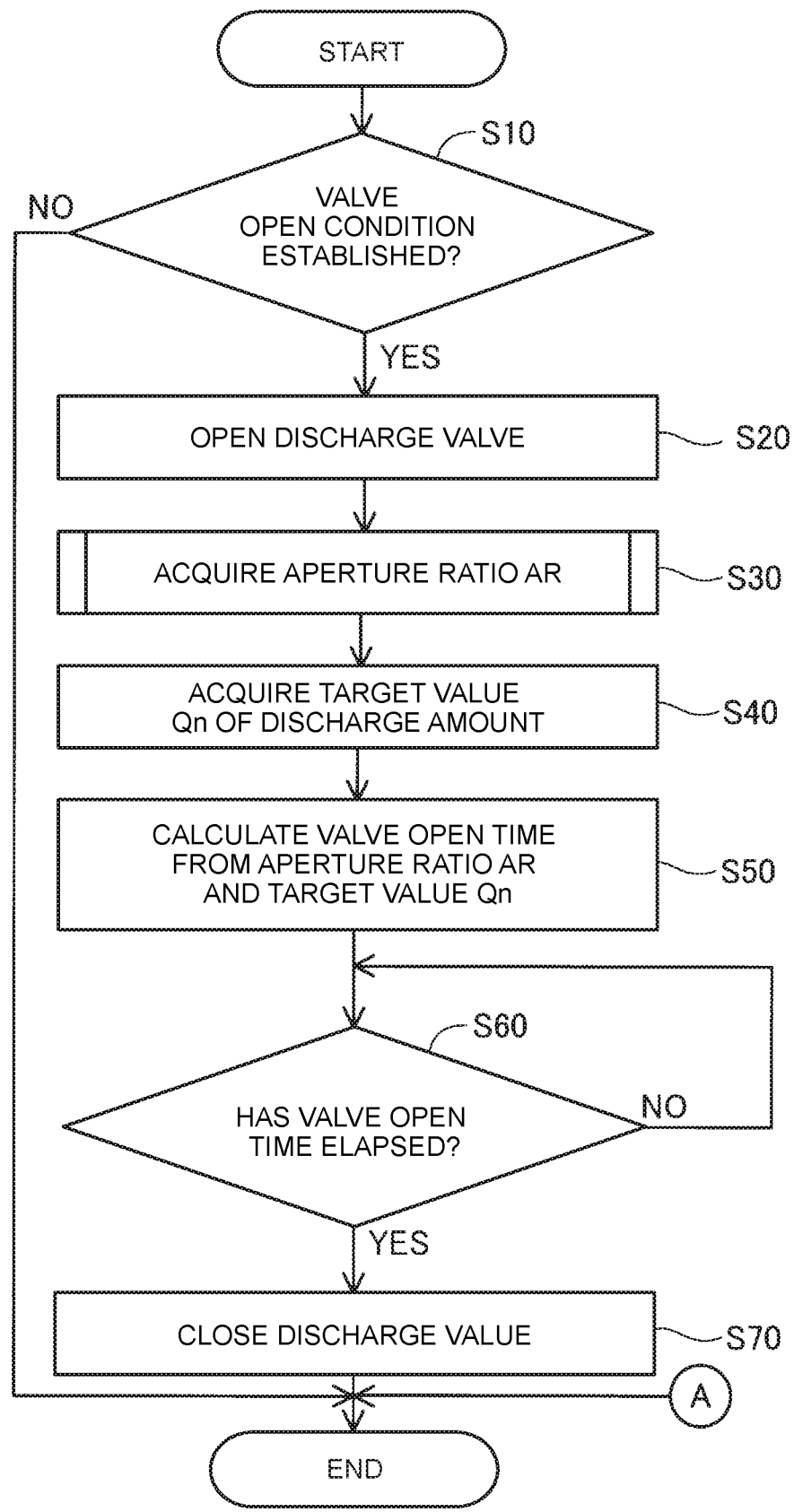
FIG. 2 is a flowchart illustrating opening/closing processing of a discharge valve.

FIG. 2 is a flowchart illustrating opening/closing processing of the discharge valve 63 executed by the control section 21. The opening/closing processing is repeatedly executed during a start of the fuel cell system 100. In step S10, the control section 21 determines whether the valve open condition for the discharge valve 63 is established. If any of the above-described valve open conditions is established, the processing proceeds to step S20, and the control section 21 opens the discharge valve 63. If the valve open condition is not established, the control section 21 terminates this routine.

In step S30, the control section 21 acquires an aperture ratio AR of the anode-off gas discharge channel. In this embodiment, the aperture ratio AR is a ratio of an area where the anode-off gas flows to a channel cross-sectional area of a portion of the anode-off gas pipe 61 on a downstream side of the discharge valve 63. In the case where ice exists in a part of the discharge channel, or the like, the aperture ratio AR is lower than 100%. A value that is acquired by multiplying the channel cross-sectional area by the aperture ratio AR corresponds to an effective cross-sectional area for the anode-off gas.

Figure 3:
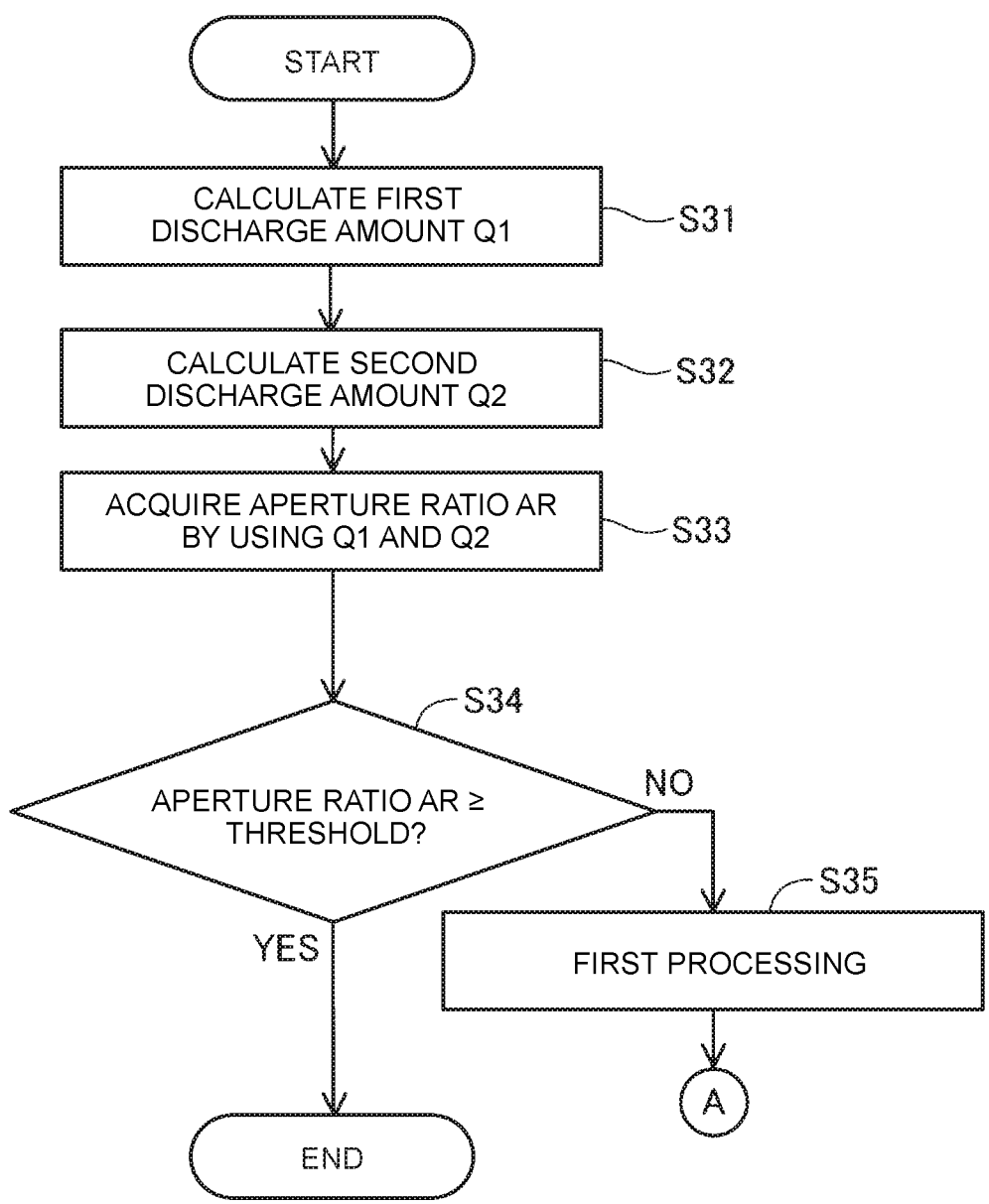
FIG. 3 is a flowchart illustrating aperture ratio acquisition processing.

FIG. 3 is a flowchart illustrating aperture ratio acquisition processing. In step S31, the control section 21 calculates a first discharge amount Q1 of the anode-off gas that is discharged from the discharge valve 63 in a predetermined period $\Delta t$ from time t0, at which the discharge valve 63 is opened, to time t1. In this embodiment, the control section 21 calculates a mol variation from a variation $\Delta P$ in a pressure value of the pressure sensor 67 from the time t0 to the time t1 and a gas state equation, and uses the calculated mol variation to calculate the first discharge amount Q1. The period $\Delta t$ is a shorter time than a valve open time Ta in which a target value Qn of the anode-off gas is discharged in a state where the aperture ratio is 100%. For example, the period $\Delta t$ may be any time between a half to one-tenth of the valve open time Ta.

In step S32, the control section 21 calculates a second discharge amount Q2 of the anode-off gas that corresponds to the predetermined period $\Delta t$ from the time to, at which the discharge valve 63 is opened, to the time t1 in the case where the aperture ratio AR is in a reference state. In this embodiment, the control section 21 refers to a map that defines an elapsed time from opening of the discharge valve 63 and the anode-off gas discharge amount in the case where the aperture ratio is in the reference state, and then calculates the second discharge amount Q2 in the period $\Delta t$. The map can be acquired by experiment or a simulation for calculating the anode-off gas discharge amount in the case where the aperture ratio is changed. Instead of the map, the control section 21 may refer to a relational expression that defines the elapsed time from opening of the discharge valve 63 and the anode-off gas discharge amount in the case where the aperture ratio is in the reference state. In this embodiment, the reference state is a state where the aperture ratio is 100%. In other words, the reference state in this embodiment is a state where the discharge channel is not closed at all.

In step S33, the control section 21 acquires the aperture ratio AR by using the first discharge amount Q1 and the second discharge amount Q2. In this embodiment, the control section 21 acquires a ratio (Q1/Q2) of the first discharge amount Q1 to the second discharge amount Q2 as the current aperture ratio AR. Each of the first discharge amount Q1 and the second discharge amount Q2 is the anode-off gas discharge amount in the same period Δt. Thus, the acquisition of the aperture ratio AR by using the first discharge amount Q1 and the second discharge amount Q2 is the same as the acquisition of the aperture ratio AR based on a ratio between an actual anode-off gas discharge speed (a first discharge speed V1) and an anode-off gas discharge speed (a second discharge speed V2) of the case where the aperture ratio AR is in the reference state.

In step S34, the control section 21 determines whether the acquired aperture ratio AR is equal to or higher than a threshold. The threshold is the aperture ratio AR when it is determined that the discharge valve 63 is not opened, and is a value that is lower than 5%, for example. An example of the case where the discharge valve 63 is not opened is a case where the discharge valve 63 is frozen. If the aperture ratio AR is lower than the threshold, in step S35, the control section 21 executes first processing. Then, the control section 21 skips step S50 to step S70 in FIG. 2 and terminates the opening/closing processing. The first processing is known processing that is executed when the discharge valve 63 is not opened. For example, the first processing may be processing to notify information indicating that the discharge valve 63 is not opened by using a display or an audio output device, which is not illustrated. If the aperture ratio AR is equal to or higher than the threshold, the processing proceeds to step S40.

Referring back to FIG. 2, in step S40, the control section 21 acquires the target value Qn of the anode-off gas discharge amount. The target value Qn of the anode-off gas discharge amount is defined based on the concentration of the impurities such as nitrogen, which should be reduced, in the anode-off gas.

In step S50, the control section 21 calculates the valve open time of the discharge valve 63 that corresponds to the target value Qn by using the aperture ratio AR acquired in step S30 and the target value Qn acquired in step S40.

Figure 4:
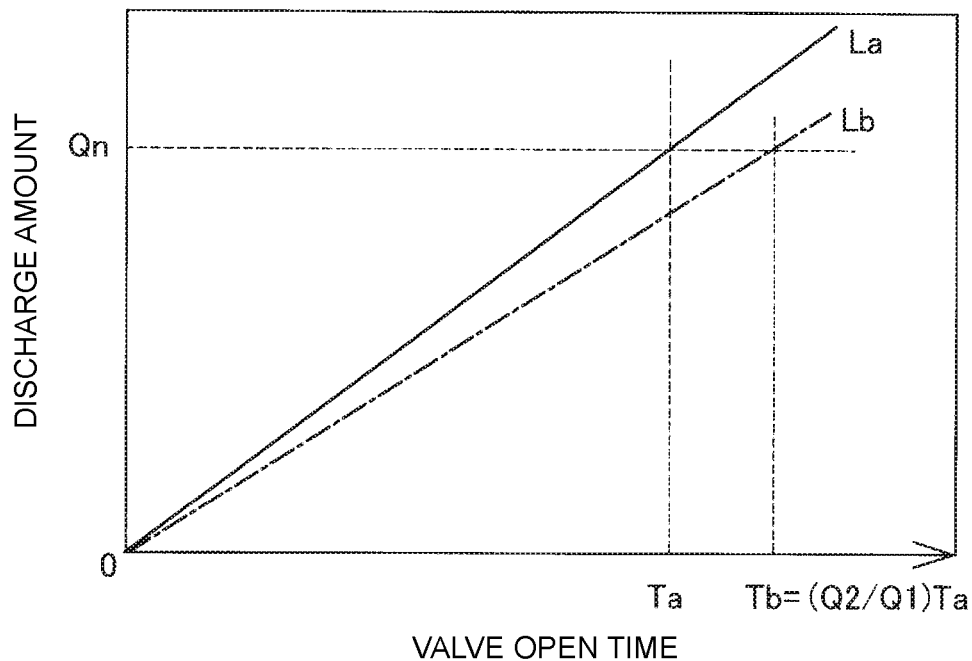
FIG. 4 is a graph representing a relationship between a valve open time and an anode-off gas discharge amount.

FIG. 4 is a graph representing a relationship between the valve open time and the anode-off gas discharge amount. FIG. 4 includes the target value Qn of the anode-off gas discharge amount, a graph La, and a graph Lb. The graph La represents the relationship between the valve open time and the anode-off gas discharge amount in the case where the aperture ratio is 100%. The graph Lb represents the relationship between the valve open time and the anode-off gas discharge amount that corresponds to the current aperture ratio AR. In this embodiment, in step S50, the control section 21 calculates the valve open time Ta at the time when the aperture ratio is 100% from the target value Qn and the graph La. The control section 21 calculates a valve open time Tb that corresponds to the current aperture ratio AR by using the calculated valve open time Ta and the aperture ratio AR acquired in step S30. More specifically, the control section 21 calculates, as the valve open time Tb, a time (Q2/Q1) Ta that is acquired by dividing the valve open time Ta by the acquired aperture ratio AR. A series of the processing in step S30, step S40, and step S50 is also referred to as the "valve open time calculation processing".

Referring back to FIG. 2, in step S60, the control section 21 determines whether the valve open time Tb, which is calculated in step S50, has elapsed since the discharge valve 63 is opened. Before a lapse of the valve open time Tb, the control section 21 keeps a valve open state of the discharge valve 63. If the valve open time Tb has elapsed, the processing proceeds to step S70, and the control section 21 closes the discharge valve 63. In another embodiment, the control section 21 may close the discharge valve 63 in the case where a time that is acquired by subtracting a correction time a from the valve open time Tb or by adding the correction time a to the valve open time Tb has elapsed. For example, the correction time a may be defined based on a difference in a configuration of the discharge valve 63 between the case where the first discharge amount Q1 is calculated and the case where the second discharge amount Q2 is calculated, or the like.

According to this embodiment, the valve open time Tb is calculated by using the aperture ratio AR, which is acquired from the first discharge amount Q1 of the anode-off gas discharged from the discharge valve 63, and the target value Qn of the anode-off gas discharge amount. Then, the discharge valve 63 is closed based on the valve open time Tb. Thus, even in the case where the part of the discharge channel is closed by freezing or the like, it is possible to discharge the target amount of the anode-off gas. As a result, it is possible to keep the concentration of the anode gas on the upstream side of the discharge valve 63 at a desired value. Therefore, it is possible to stabilize the generation of the electricity by the fuel cell stack 10. In addition, the discharge valve 63 is closed based on the valve open time Tb. Thus, compared to a case where such control is executed that the actual anode-off gas discharge amount is sequentially calculated and the discharge valve is closed when a total of the calculated discharge amounts reaches a target value, it is possible to reduce a processing load of the control section 21 related to the opening/closing processing.

According to this embodiment, it is possible to calculate the first discharge amount Q1 by using the variation ΔP in the pressure value of the pressure sensor 67 arranged on the upstream side of the discharge valve 63 and thereby acquire the aperture ratio AR.

2. Other Embodiments 2-1. First Other Embodiment

Figure 5:
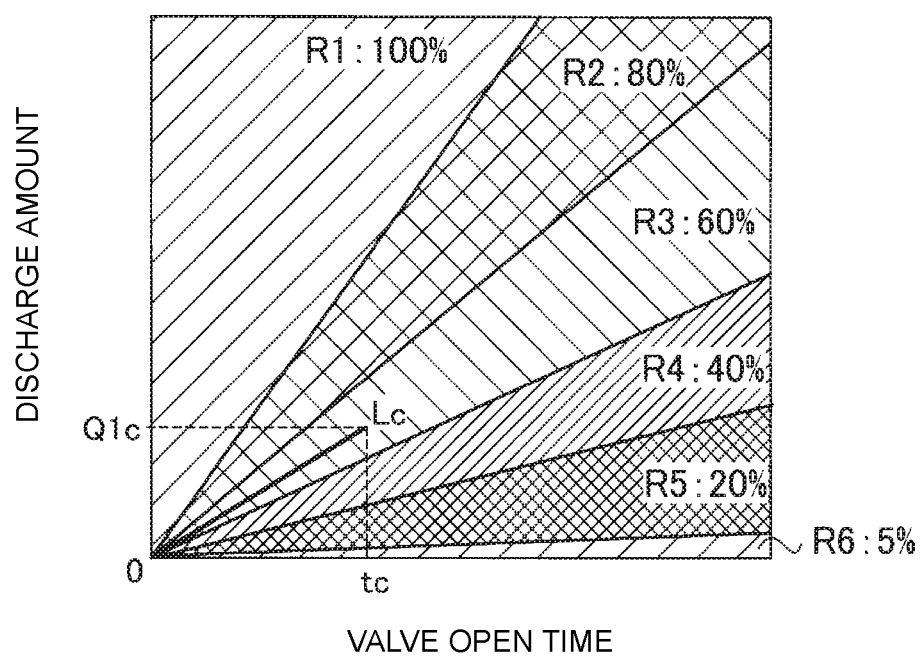
FIG. 5 is a graph for illustrating another aspect of the aperture ratio acquisition processing.

A description will be made on another aspect of the aperture ratio acquisition processing (FIG. 2, step S30) with reference to FIG. 5. FIG. 5 is a map that represents a relationship among the valve open time, the anode-off gas discharge amount, and the aperture ratio. In FIG. 5, regions R1, R2, R3, R4, R5, R6 that are hatched differently respectively represent possible value ranges of the second discharge amount Q2 with respect to the valve open time when the aperture ratios are equal to or lower than about 100%, about 80%, about 60%, about 40%, about 20%, and about 5%. That is, FIG. 5 illustrates, as the reference state, the aperture ratios that are equal to or lower than about 100%, about 80%, about 60%, about 40%, about 20%, and about 5% and the second discharge amounts Q2 corresponding to the aperture ratios. A graph Lc represents a relationship between a time tc from the valve opening and a first discharge amount Q1c. In the aperture ratio acquisition processing, the control section 21 may calculate the first discharge amount Q1 after a lapse of a specified period since the discharge valve 63 is opened. Then, the control section 21 may acquire the current aperture ratio AR by referring to the relationship between each of the plural reference states and the second discharge amount Q2 corresponding to the respective reference state. In the example illustrated in FIG. 5, the control section 21 may calculate the first discharge amount Q1c after the lapse of the period tc since the discharge valve 63 is opened. Then, the control section 21 may acquire, as the current aperture ratio AR, the aperture ratio 60% that corresponds to the region R3 where the first discharge amount Q1c is located. This embodiment exerts similar effects to those of the above-described embodiment.

2-2. Second Other Embodiment

In the above embodiment, the control section 21 may execute the aperture ratio acquisition processing illustrated in FIG. 3 when the fuel cell stack 10 does not generate the electricity. The time when the electricity is not generated is, for example, a time that is after the fuel cell system 100 is activated and before the fuel cell stack 10 starts generating the electricity. According to this embodiment, the variation $\Delta P$ in the pressure value, which is used to acquire the aperture ratio AR, does not include the variation in the pressure value caused by the supply of the anode gas from the injector 55, consumption of the anode gas by the fuel cell stack 10 at the time of generating the electricity, and the like. Thus, it is possible to suppress the variation $\Delta P$ from being influenced by the factor other than the anode-off gas discharge speed. As a result, it is possible to further accurately calculate the aperture ratio AR and to further accurately calculate the valve open time for discharging the target amount of the anode-off gas. Therefore, it is possible to further accurately discharge the target amount of the anode-off gas.

2-3. Third Other Embodiment

In the above embodiment, the control section 21 may use the aperture ratio AR of the discharge valve 63 that is acquired in the past for the current valve open time calculation processing. That is, in step S30 (in FIG. 2) of the current valve open time calculation processing, instead of executing the processing in step S31 to step S34 illustrated in FIG. 3, the control section 21 may acquire the aperture ratio AR stored in the memory, and may calculate the valve open time by using such an aperture ratio AR in step S50. According to this embodiment, in the current valve open time calculation processing, it is possible to shorten a time required for the processing in step S31 to step S34 illustrated in FIG. 3. Thus, even in the case where the calculated valve open time is short, the discharge valve 63 can be closed after the lapse of the valve open time. In addition, it is possible to reduce the load of the control section 21 related to the processing to calculate the aperture ratio.

2-4. Fourth Other Embodiment

The second other embodiment and the third other embodiment described above may be combined. In step S30 (in FIG. 2), the control section 21 may acquire the aperture ratio AR, which is calculated when the electricity is not generated, from the memory. Then, in step S50, the control section 21 may calculate the valve open time by using such an aperture ratio AR. In a large-load state where a magnitude of the requested electricity to the fuel cell stack 10 is relatively large, the variation $\Delta P$ in the pressure value is influenced by the factors other than the anode-off gas discharge speed, such as the supply of the anode gas from the injector 55 and the consumption of the anode gas by the fuel cell stack 10 at the time of generating the electricity. According to this embodiment, the valve open time is calculated by using the aperture ratio AR that is acquired in the state where the variation $\Delta P$ is unlikely to be influenced by the factor other than the anode-off gas discharge speed. Thus, even in the large-load state, it is possible to further accurately calculate the valve open time corresponding to the target value Qn. As a result, it is possible to further accurately discharge the target amount of the anode-off gas. Therefore, also, in the large-load state, it is possible to stably continue the generation of the electricity by the fuel cell stack 10.

2-5. Fifth Other Embodiment

In the above embodiment, the fuel cell system 100 may include a sensor in a portion of the anode-off gas pipe 61 on the downstream side of the discharge valve 63, and the sensor can measure an anode-off gas discharge flow rate. The control section 21 may acquire a measurement value of the sensor and calculate the first discharge amount Q1.

2-6. Sixth Other Embodiment

In the above embodiment, the circulation pipe 64 and the anode gas pump 65 in the anode gas supply discharge section 50 may not be provided. That is, the configuration of the fuel cell system 100 may be a configuration that does not circulate the anode-off gas.

2-7. Seventh Other Embodiment

In the above embodiment, when the aperture ratio AR is calculated from the first discharge amount Q1 and the second discharge amount Q2 in step S34, density of gas in the anode-off gas may be considered. For example, a correction formula that is defined in advance and is correlated with the temperature may be used to correct density of nitrogen in the first discharge amount Q1 to be substantially equal to that in the second discharge amount Q2 as a reference. As the temperature at the time when the density of the gas is calculated, the temperature of the fuel cell stack 10 acquired by the temperature sensor 77 can be used.

2-8. Eighth Other Embodiment

In the above embodiment, the fuel cell system 100 is mounted on the vehicle 110. However, the fuel cell system 100 may be mounted on a movable object other than the vehicle 110 such as a watercraft, a train, or a robot, or may be fixed at a position.

The present disclosure is not limited to the above-described embodiments and can be implemented by having any of various configurations within the scope that does not depart from the gist of the present disclosure. For example, technical features in the embodiment and the other embodiments that correspond to technical features in the aspects described in SUMMARY can appropriately be replaced or combined to solve a part or the whole of the above-described problem or to achieve some or all of the above-described effects. In addition, when any of those technical features is not described as being essential in the present specification, such technical feature(s) can appropriately be eliminated.

What is claimed is:

1. A fuel cell system comprising:
a fuel cell that generates electricity when being supplied with anode gas and cathode gas;
a supply channel through which the anode gas to be supplied to the fuel cell flows;
a discharge channel through which anode-off gas discharged from the fuel cell flows;
a discharge valve that is provided on the discharge channel and is opened to discharge the anode-off gas; and
a control section that controls opening/closing of the discharge valve, wherein
the control section calculates a valve open time of the discharge valve that corresponds to a target value of a discharge amount of the anode-off gas by using an aperture ratio of the discharge channel and the target value, and closes the discharge valve based on the valve open time, the aperture ratio of the discharge channel being calculated from a first discharge amount of the anode-off gas, which is discharged by opening of the discharge valve, in a predetermined period.

2. A The fuel cell system according to claim 1 further comprising:
a pressure sensor that is arranged on an upstream side of the discharge valve, wherein
the control section calculates the first discharge amount by using a variation in a pressure value that is measured by the pressure sensor, and calculates the aperture ratio from the first discharge amount.

3. The fuel cell system according to claim 2, wherein
the control section calculates the aperture ratio from the first discharge amount at the time when the fuel cell does not generate the electricity.

4. An opening/closing method for a discharge valve provided in a discharge channel of anode-off gas discharged from a fuel cell in a fuel cell system including the fuel cell that generates electricity when being supplied with anode gas and cathode gas, the method comprising:
calculating a valve open time of the discharge valve that corresponds to a target value of a discharge amount of the anode-off gas by using an aperture ratio of the discharge channel and the target value, the aperture ratio of the discharge channel being calculated from a first discharge amount of the anode-off gas, which is discharged by opening of the discharge valve, in a predetermined period; and
closing the discharge valve based on the valve open time.

* * * * *